(12) United States Patent
Namikata

(10) Patent No.: US 7,054,033 B2
(45) Date of Patent: May 30, 2006

(54) IMAGE PROCESSING METHOD, IMAGE PROCESSING APPARATUS, AND STORAGE MEDIUM

(75) Inventor: Takeshi Namikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 09/948,605

(22) Filed: Sep. 10, 2001

(65) Prior Publication Data

US 2002/0031258 A1    Mar. 14, 2002

(30) Foreign Application Priority Data

Sep. 12, 2000    (JP)    .............................. 2000/276479

(51) Int. Cl.
   *G06F 15/00*    (2006.01)
(52) U.S. Cl. ................. 358/1.9; 358/525; 358/518; 358/523; 345/604; 382/167
(58) Field of Classification Search ............... 358/1.9, 358/523, 525, 518, 504, 520, 521; 345/604, 345/600; 382/167, 162, 169
   See application file for complete search history.

(56) References Cited

U.S. PATENT DOCUMENTS

| | | | | |
|---|---|---|---|---|
| 5,652,831 | A * | 7/1997 | Huang et al. ................ | 345/604 |
| 5,715,330 | A * | 2/1998 | Kawasaka ................... | 382/169 |
| 6,157,469 | A * | 12/2000 | Mestha ........................ | 358/504 |
| 6,181,445 | B1 * | 1/2001 | Lin et al. ..................... | 358/520 |
| 6,275,607 | B1 * | 8/2001 | Shimizu et al. ............. | 382/167 |
| 6,278,533 | B1 * | 8/2001 | Takemoto ................... | 358/521 |
| 6,301,383 | B1 * | 10/2001 | Ito et al. ...................... | 382/162 |
| 6,373,595 | B1 * | 4/2002 | Semba et al. ................ | 358/1.9 |
| 6,437,792 | B1 * | 8/2002 | Ito et al. ...................... | 345/600 |
| 6,611,356 | B1 * | 8/2003 | Shimizu et al. .............. | 358/1.9 |
| 6,671,072 | B1 * | 12/2003 | Nagae et al. ................. | 358/1.9 |
| 6,888,648 | B1 * | 5/2005 | Odagiri et al. .............. | 358/1.9 |
| 2002/0060797 | A1 | 5/2002 | Namikata .................... | 358/1.9 |

FOREIGN PATENT DOCUMENTS

JP    09-186895 A    7/1997

\* cited by examiner

*Primary Examiner*—Kimberly Williams
*Assistant Examiner*—Beniyam Menberu
(74) *Attorney, Agent, or Firm*—Fitzpatrick, Cella, Harper & Scinto

(57) ABSTRACT

To approximate with precision the nonlinear output characteristic of an output device and enable high-precise color reproduction, a method is provided to convert a device-independent color space into an output device-dependent color space. A colorimetry value of a color patch output by the output device and represented in the device-independent color space is input, and a colorimetry value close to a conversion target value represented in the device-independent color space is extracted from the input colorimetry value. According to a distance between the input and extracted colorimetry values in the device-independent color space, there is performed a weighting process for a color value corresponding to the extracted colorimetry value and represented in the output device-dependent color space, to obtain a color value corresponding to the input colorimetry value and represented in the output device-dependent color space.

9 Claims, 7 Drawing Sheets

|   | R | G | B |   | L | a | b |
|---|---|---|---|---|---|---|---|
|   | 0 | 0 | 0 |   | 0 | 0 | b |
|   | 0 | 0 | 16 |   | 12 | −1 | −10 |
|   |   | ⋮ |   |   |   | ⋮ |   |
|   | 255 | 255 | 255 |   | 100 | 0 | 0 |

IMAGE PROCESSING METHOD, IMAGE PROCESSING APPARATUS, AND STORAGE MEDIUM

BACKGROUND OF THE INVENTION

1. Field of the Invention

The present invention relates to a method and an apparatus for performing a conversion process on the basis of a colorimetry result of a color patch output by an output device.

2. Related Background Art

Conventionally, a color masking method of obtaining an output color space by performing a matrix calculation on an input color space, and a method of obtaining an output color space from an input color space using a lookup table (LUT), have been widely used as methods of correcting color to improve a color reproduction effect in a color reproduction process on a printer.

However, since the output characteristic of a color printer includes strong nonlinearity, a global method such as the color masking method, that is, a method in which the entire output color space is affected by a change of a matrix value, has difficulty in adequately approximating the characteristic of a color printer in all color ranges. Also, in the method using the LUT, table values are often determined according to the masking method, so that the same difficulty in color reproducibility is found.

SUMMARY OF THE INVENTION

An object of the present invention is to approximate with precision the nonlinear output characteristic of an output device and thus to enable color reproduction with high precision.

In order to achieve the above object, the present invention is, in one aspect, a color processing method for converting a device-independent color space into a color space dependent on an output device. In this method, colorimetry values of color patches output by the output device are input, the colorimetry values representing points in the device-independent color space. Colorimetry values close to a conversion target value represented in the device-independent color space, are extracted from the input colorimetry values, the number of the extracted colorimetry values complying with brightness of the conversion target value. There is performed, according to respective distances between the conversion target value and each extracted colorimetry value in the device-independent color space, a weighting process for an output device dependent color value corresponding to respective ones of the extracted colorimetry values so as to obtain an output device dependent color value corresponding to the conversion target value.

The above and other objects, features and advantages of the invention will become more apparent by reference to the following detailed description of the invention taken in conjunction with the accompanying drawings.

DETAILED DESCRIPTION OF THE PREFERRED EMBODIMENTS

First Embodiment

The first preferred embodiment of the present invention will be described below by referring to the attached drawings.

Figure 1:
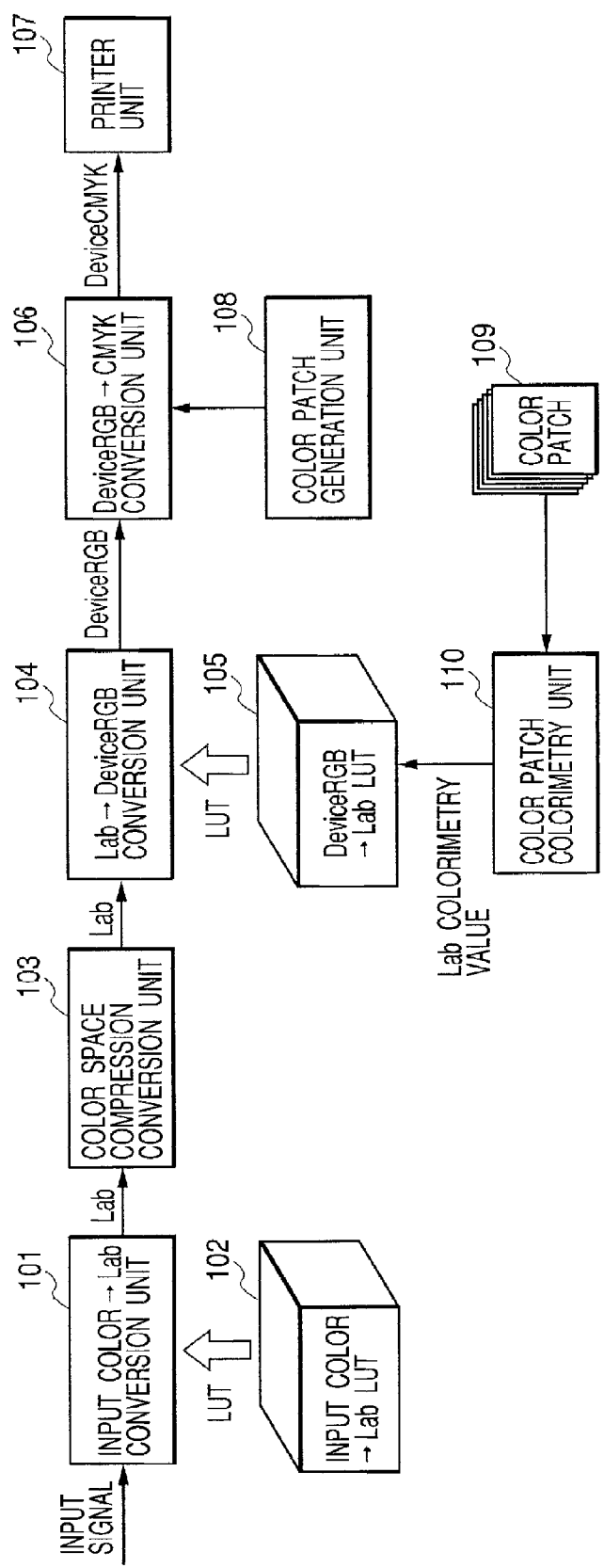
FIG. 1 is a diagram showing the configuration of the first preferred embodiment of the present invention.

FIG. 1 shows the contents of the process according to the present embodiment. An input signal is a color space signal dependent on a device, and can be, for example, an RGB signal read by a scanner A, a CMYK signal to be output to a printer B. When the present embodiment is applied to a copying machine, the signal can be the RGB signal read by the scanner. When a proof is checked, the signal can be the CMYK signal to be output to the target printer.

Figures 2, 3:
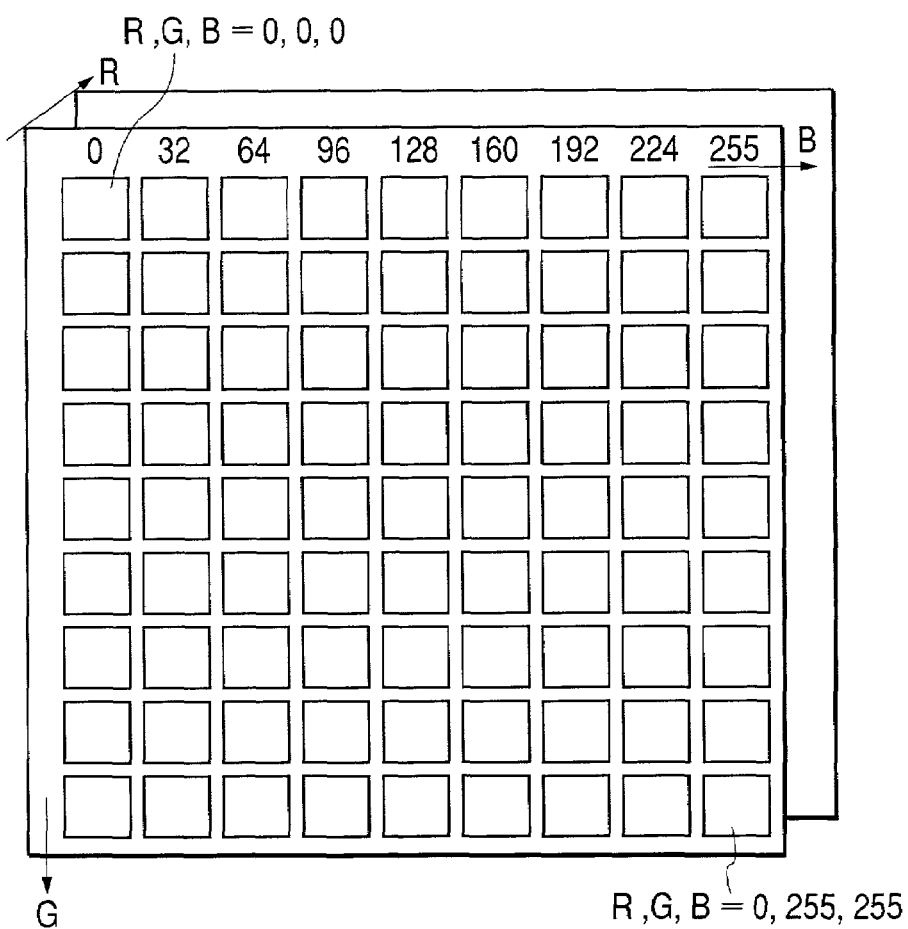
FIG. 2 is a diagram showing an example of an input color→Lab LUT 102.
FIG. 3 is a diagram showing an example of a color patch 109.

The above input signals are input to an input color→Lab conversion unit 101, and converted into signals in a Lab space which is a color space independent of a device. According to the present embodiment, the conversion is realized by an LUT conversion using the input color→Lab LUT 102. At this time, a table used in the conversion is to be set appropriately in an input color space. For example, when an RGB color space dependent on the scanner A is used at the input side, a three-dimensional input/three-dimensional output RGB→Lab conversion table corresponding to an RGB signal value and a Lab value dependent on the scanner A is set as an LUT. Similarly, when a CMYK color space dependent on the printer B is used at the input side, a four-dimensional input/three-dimensional output CMYK→Lab conversion table corresponding to a CMYK signal value and a Lab value dependent on the printer B is set as an LUT. FIG. 2 shows an example of an LUT. The example shown in FIG. 2 illustrates the correspondence between an RGB value having 8 bits for each of the R, G, and B and a Lab value, and only the Lab value is stored as an actual LUT.

In the input color→Lab conversion unit 101, the address on the table is computed from the input signal to retrieve the Lab value from the LUT, interpolation calculation is performed using the retrieved Lab value, and a Lab value corresponding to the input signal is obtained.

The Lab signal obtained by the input color→Lab conversion unit 101 is then input to a Lab→DeviceRGB conversion unit 104, and is converted into a signal in a DeviceRGB space that is a space dependent on a printer 107 by using DeviceRGB→Lab LUT 105.

When the input color space is an RGB space, the color range is larger than the color reproduction range of the printer in most cases. Therefore, a color space compression conversion unit (or a color gamut mapping unit) 103 first performs a mapping process in the color reproduction range, and then inputs a Lab signal into the Lab→DeviceRGB conversion unit 104.

A signal converted by the Lab→DeviceRGB conversion unit 104 for the DeviceRGB space is also converted by the DeviceRGB→CMYK conversion unit 106 for a CMYK color space dependent on the printer 107, and is then transferred to the printer 107. Various well-known methods can be used for the DeviceRGB→CMYK conversion, and thus any of those methods can be arbitrarily used.

According to the present embodiment, the following equations are used for conversion.

$$K=\min(1.0\text{-}R, 1.0\text{-}G, 1.0\text{-}B)$$

$$C=(1.0\text{-}R)\text{-}K$$

$$M=(1.0\text{-}G)\text{-}K$$

$$Y=(1.0\text{-}B)\text{-}K$$

(Lab→DeviceRGB Conversion Process)

Described below in detail are the Lab→DeviceRGB conversion unit 104 and the DeviceRGB→Lab LUT 105. In the Lab→DeviceRGB conversion unit 104, a conversion process is performed based on the correspondence between the DeviceRGB signal value stored in a color patch generation unit 108 and the Lab colorimetry value obtained by the color patch colorimetry unit 110.

(Generation of DeviceRGB→Lab LUT 105)

First, the color patch generation unit 108 generates a color patch signal indicating a color patch image as shown in FIG. 3. The color patch signal is transferred to the printer 107 through a process path only passing the DeviceRGB→CMYK conversion unit 106, and the printer 107 generates a color patch image 109.

The color patch signal is generated such that the DeviceRGB space can be equally divided. In FIG. 3, an RGB space having 8 bits each for R, G, and B is equally divided into 9×9×9 units, and 729 patches are obtained. In this example, the color space dependent on the printer 107 is a CMYK color space. However, since it is considered that an RGB space can be converted into a CMYK color space according to the conversion rule from the RGB space, the RGB space is considered to be a color space dependent on the printer 107.

Figure 4:
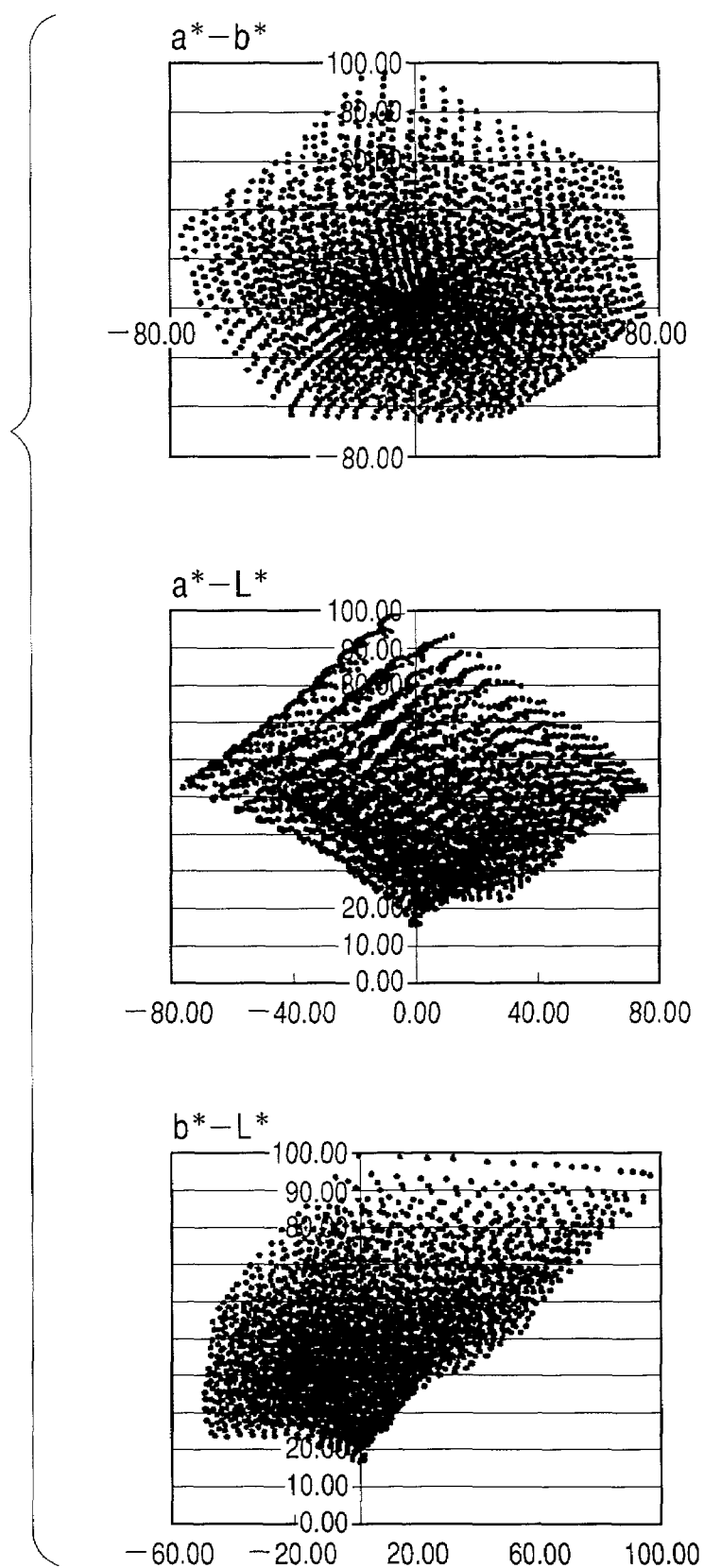
FIG. 4 is a diagram showing colorimetry values obtained in a colorimetry process by a color patch colorimetry unit 110.

Second, the color patch colorimetry unit 110 performs a colorimetry process on the obtained color patch image 109, and a Lab colorimetry value is obtained for each patch. FIG. 4 shows an example of the obtained Lab colorimetry value.

In the operation, the RGB value generated by the color patch generation unit 108 and the Lab colorimetry value obtained by the color patch colorimetry unit 110 can be obtained. Therefore, a DeviceRGB→Lab LUT for storing the correspondence between the DeviceRGB and the Lab colorimetry value on the points on which the DeviceRGB space is equally divided can be obtained.

(Lab→DeviceRGB Conversion)

A Lab→deviceRGB conversion is performed using the generated DeviceRGB→Lab LUT, but a problem occurs in the conversion. That is, when an LUT computation is performed, conventional interpolation calculation such as the interpolation on a cube, the interpolation on a tetrahedron, etc. is performed. However, the above interpolation calculation can only be performed on a table value when the table input side has a uniform grid. Nevertheless, the DeviceRGB→Lab LUT obtained in the above process does not have a uniform table value for an input Lab value. Therefore, the interpolation calculation cannot be normally performed using a Lab value as an input value.

Therefore, according to the present embodiment, a Lab→deviceRGB conversion is performed in the following procedure.

First, the distance (equal to the color difference obtained by a Lab color difference equation) between the Lab value in the DeviceRGB→Lab LUT and the input Lab signal is computed and stored. The obtained distance is expressed by d.

Second, N entries are selected from the DeviceRGB→Lab LUT in order from the shortest distance d for the input Lab value.

At this time, the Lab values are expressed as follows in order from the shortest distance.

DeviceRGB1→Lab1 d1
DeviceRGB2→Lab2 d2
DeviceRGB3→Lab3 d3
. . .

Figure 5:
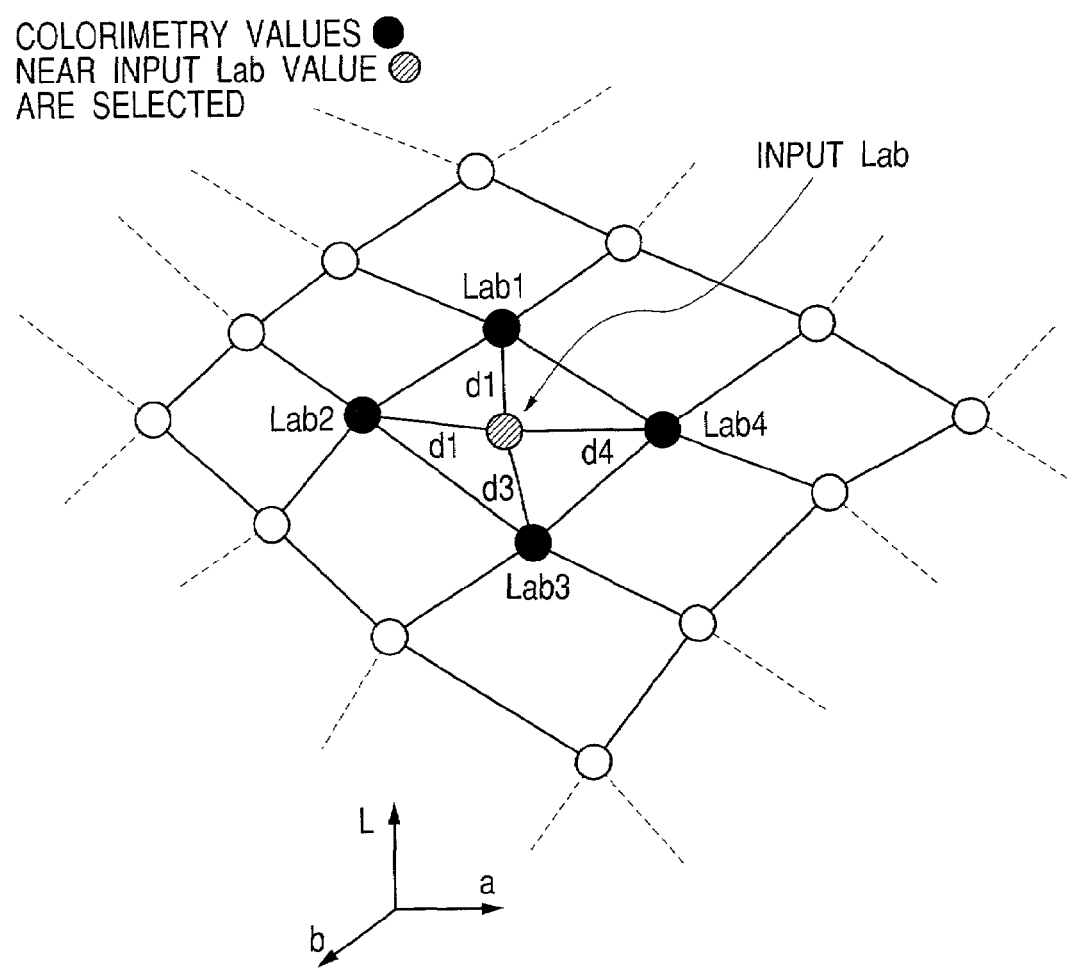
FIG. 5 is a diagram showing the process of selecting Lab values (Lab→DeviceRGB conversion unit 104)

FIG. 5 shows the process of selecting Lab1, Lab2, . . .

Third, the DeviceRGB value for an input Lab value is computed as follows.

$$RGB=\Sigma RGBi \times f(di)$$

$$I=N$$

$$f(x)=1/(1+x^4)$$

Figure 6:
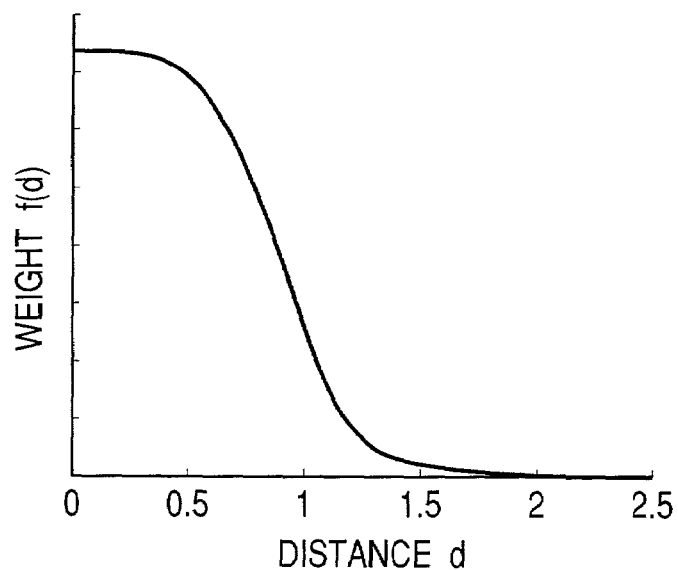
FIG. 6 is a diagram showing a weight function depending on distance.

In this case, f(x) is a function having the curve as shown in FIG. 6. That is, the interpolation calculation is performed with a larger weight assigned to an RGB value having a shorter distance in the Lab space.

The number N of the table values in the interpolation calculation can be constant (e.g., 8) in the Lab space.

However, in the method of the DeviceRGB→CMYK conversion unit, as shown in FIG. 4, the colorimetry values concentrate on a low brightness L* area. Therefore, a problem can occur when N is a constant. In this area, when N is too small, the distance between the input Lab value and the Lab value of the sample point is too short. Accordingly, the interpolation calculation is performed on a small number of sample points using a large weight. As a result, problems such as a gradation jump in the DeviceRGB space, a bad white balance in a low brightness range, etc., occur.

Figure 7:
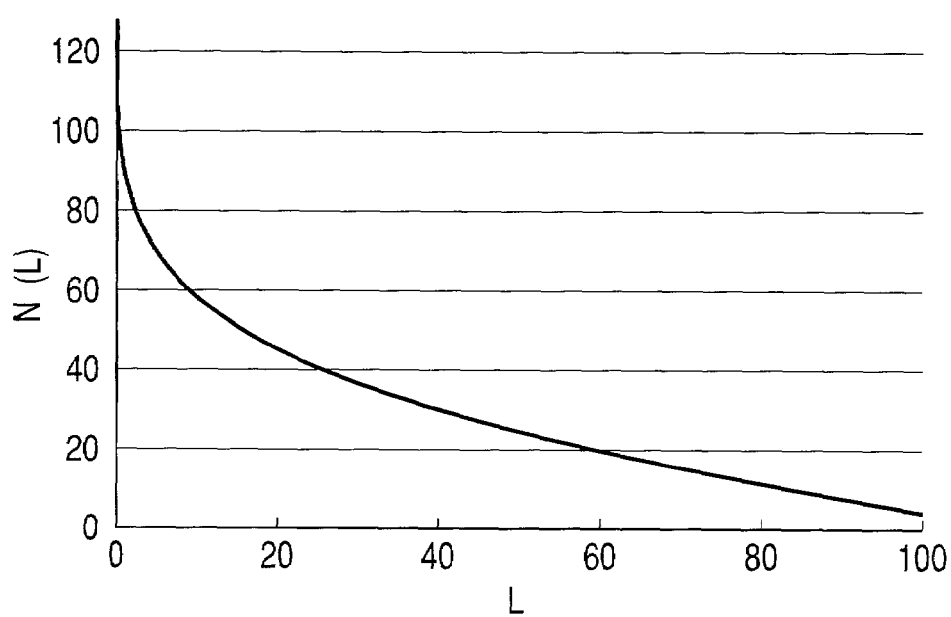
FIG. 7 is a diagram showing a sample point function.

Therefore, when the interpolation calculation is performed by changing the number of samples depending on the value of the L of the input Lab value as shown in FIG. 7, the effect of solving the above problems can be obtained. Furthermore, in a high brightness range, the number of samples in the interpolation calculation can be limited, thereby suppressing unclear color. In the function N(L) shown in FIG. 7, the ¼ exponent function is shown as an example with the value of 128 assigned to L=0, and the value of 4 assigned to L=100.

(Color Space Compression)

Described below is the color space compression method used by the color space compression conversion unit 103. There are various methods of color space compression. For example, a color space compression process is performed in a uniform color space as disclosed by Japanese Patent Application Laid-Open No. 8-130655.

Another example is a method of setting a color space compression conversion condition using a Lab colorimetry value obtained by the color patch colorimetry unit 110.

In this color space compression method, a predetermined number (e.g., 8) of Lab values are selected from the DeviceRGB→Lab LUT such that the distance d between the input color outside the color reproduction range and the Lab value of the point of the vertical line down onto the color reproduction range from the input color is short, and that the Lab value is positioned on the outside edge of the color reproduction range. The data of the position of the outside edge of the color reproduction range is the data of the position on the 6 planes of a cube forming a DeviceRGB space. That is, the data of the position of the outside edge of the color reproduction range can be detected in advance based on the RGB value generated by the color patch generation unit 108.

As in the above method of obtaining the DeviceRGB for the input Lab value, the interpolating process is performed using a predetermined number of Lab values weighted by the distance d, and a conversion Lab value in the color reproduction range corresponding to the input color outside the color reproduction range is obtained.

In this color space compression method, an input color outside the color reproduction range can be converted into a color near the outside edge of the color reproduction range having a Lab value of a color close to an input color. That is, a color outside the color reproduction range can be successfully converted into a clear color.

Second Embodiment

Figure 8:
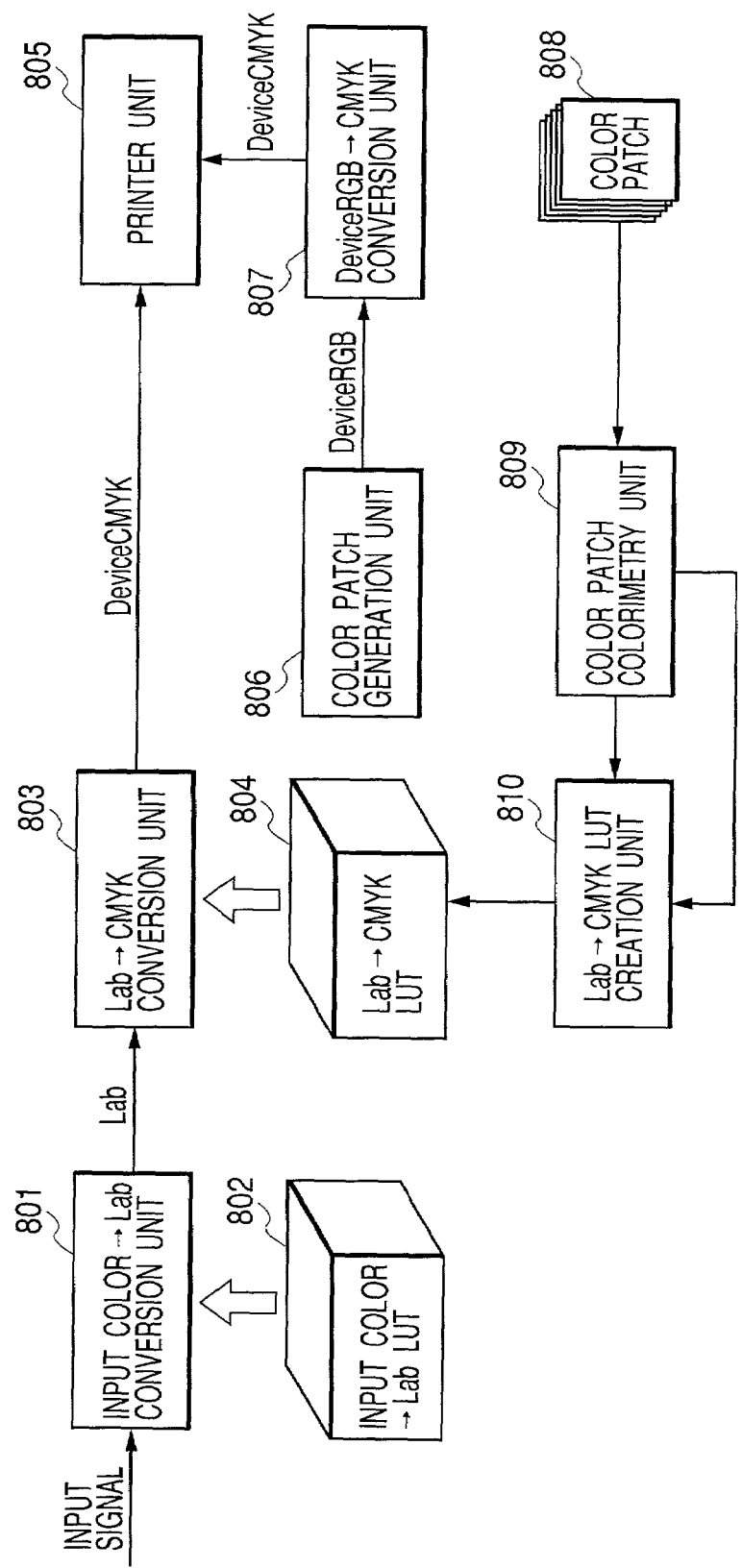
FIG. 8 is a diagram showing the configuration according to the second preferred embodiment of the present invention.

FIG. 8 shows the configuration of the second embodiment, that is, a modification of the first embodiment, of the present invention. According to the present embodiment, unlike the first embodiment, the conversion from a device independent color space to a printer-dependent color space is performed in the LUT process as in the conversion from an input color to a device independent color space.

After an input color→Lab conversion unit 801 and an input color→Lab LUT 802 perform the same processes as the input color→Lab conversion unit 101 and the input color→Lab LUT 102 according to the first embodiment, a Lab→CMYK conversion unit 803 performs an LUT conversion using a Lab→CMYK LUT 804. The CMYK signal processed in the Lab→CMYK conversion is transmitted to a printer 805 and output. The Lab→CMYK LUT 804 is created as follows. A DeviceRGB color patch image is converted into a DeviceCMYK by a DeviceRGB→CMYK conversion unit 807, and is output on the printer unit 805.

An output color patch 808 is processed by a color patch colorimetry unit 809, and an LUT is created by a Lab→CMYK LUT creation unit 810 based on the obtained colorimetry value and the RGB value generated by the color patch generation unit 806.

The process of the Lab→CMYK LUT creation unit 810 can be performed by performing the color space compression process according to the first embodiment, the Lab→DeviceRGB conversion process, and DeviceRGB→CMYK conversion on the grid value of the Lab input into the LUT.

For example, if the Lab value is processed as an eight-bit signal, then the grid of the Lab is configured with the value of L ranging from 0 to 255, and with the value of a, b ranging from −128 to 127 in 16 units. When the above processes are performed on each grid value, a Lab→CMYK LUT can be created.

With the above configuration, the conversion performed in the first embodiment from the Lab color space to the CMYK color space can be performed using the LUT, thereby efficiently performing the computation.

Third Embodiment

According to the present embodiment, the configuration used in the case in which an sRGB color space which has become a standard color space on the Internet is used as an input color space is described. The correspondence between the sRGB color space and the XYZ color space is defined, and the sRGB color space can be considered a device independent color space. Therefore, if the sRGB color value is converted into an XYZ value and a Lab value, and the conversion is performed from the Lab value to the printer color space as described above, the signal in the sRGB color space can be reproduced on a printer.

Figure 9:
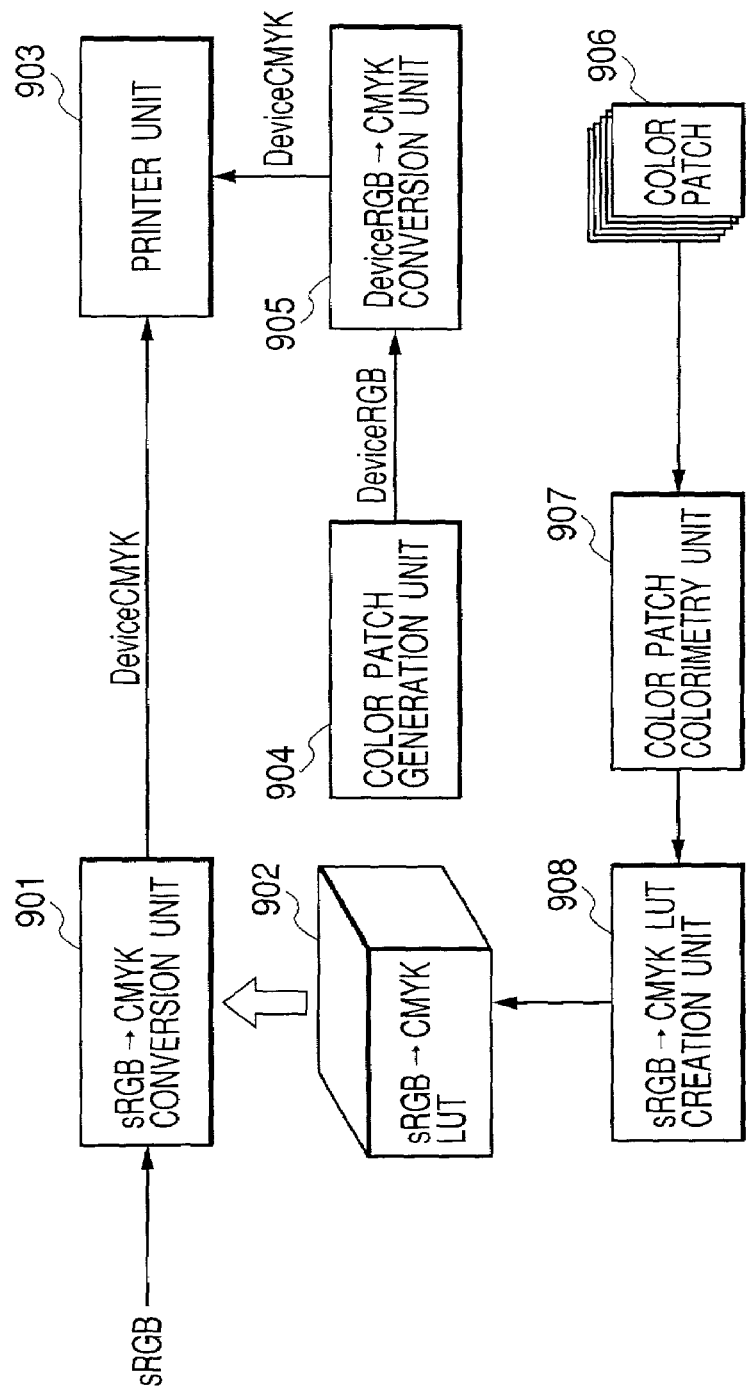
FIG. 9 is a diagram showing the configuration according to the third preferred embodiment of the present invention.

FIG. 9 shows the configuration according to the present embodiment. The input sRGB signal is converted into a CMYK value in the LUT conversion process using an sRBG→CMYK LUT 902 by an sRBG→CMYK conversion unit 901, transmitted to a printer 903, and output. The sRGB→CMYK LUT 902 is created by a sRGB→CMYK generation unit 908 based on the colorimetry value obtained by performing the colorimetry process on a color patch 906 by a color patch colorimetry unit 907 and the RBG value generated by a color patch generation unit 904. The color patch is output by the printer, by using the Device CMYK obtained by converting the Device RBG of the color patch generation unit 904 with use of the Device RBG→CMYK conversion unit 905.

An sRGB→CMYK LUT is created as follows. Assume that an input sRGB signal is processed as an eight-bit signal, and sRGB grids are configured as 17×17×17 grids. After performing operations of converting sRGB→XYZ and XYZ→Lab by a definition equation, the above Lab→DeviceRGB conversion process and DeviceRGB→CMYK conversion process are performed on each grid value, thereby obtaining an sRGB→CMYK LUT.

{Modification}

In the above embodiments, a Lab is used as a color space independent of a device, but other spaces such as XYZ, Luv, etc., can also be used.

Furthermore, a printer is used as an output device, but other output devices such as a printing device, etc., can also be used. Similarly, a color signal to be transferred to a printer unit is not limited to a YMCK signal, but other color signals can be used.

In the above embodiments, the number of patches is 729, but other numbers of patches can also be used.

While the number N of the table values for use in the interpolation calculation is set based on the brightness L as shown in FIG. 4, it may be set three-dimensionally in consideration of a and b addition to the brightness L.

Additionally, the present invention also includes the above devices operated by a program stored in the computer (CPU or MPU) of a system or a device connected to the devices to realize the function of the above embodiments and to operate the devices by providing a program code of the software for realizing the function of the above embodiments.

In this case, the functions of the above embodiments are realized by the program code of the software. The program code and a unit for providing the program code for the computer, for example, a storage medium storing the program code configure the present invention.

As a storage medium storing the program code can be a floppy disk, a hard disk, an optical disk, a magneto-optical disk, CD-ROM, a magnetic tape, a non-volatile memory card, ROM, etc.

Furthermore, the present invention obviously includes the program code not only in the realization of the functions of the above embodiment by executing the program code provided for the computer, but also in the realization of the functions of the above embodiments in cooperation with the OS (operating system) operated in the computer, or other application software, etc.

Additionally, the present invention obviously includes the program code in the realization of the functions of the above embodiments when the program code is stored in the memory of a computer function extension board or a function extension unit connected to the computer, and the CPU, etc., in the function extension board or the function extension unit performs a part or all of the actual process according to an instruction of the program code.

As many apparently widely different embodiments of the present invention can be made without departing from the spirit and scope thereof, it is to be understood that the present invention is not limited to the specific embodiments thereof expect as defined in the appended claims.

What is claimed is:

1. A color processing method for converting a device-independent color space into a color space dependent on an output device, comprising the steps of:
    inputting colorimetry values of color patches output by the output device, the colorimetry values representing points in the device-independent color space;
    extracting colorimetry values close to a conversion target value represented in the device-independent color space, from the input colorimetry values, the number of the extracted colorimetry values complying with brightness of the conversion target value; and
    performing, according to respective distances between the conversion target value and each extracted colorimetry value in the device-independent color space, a weighting process for output device dependent color values corresponding to respective ones of the extracted colorimetry values so as to obtain an output device dependent color value corresponding to the conversion target value.

2. A color processing method according to claim 1, wherein the number of the colorimetry values to be extracted is set based on the brightness and color of the conversion target value.

3. A color processing method according to claim 2, wherein the number of the colorimetry values to be extracted in high brightness is set to be smaller than the number of the colorimetry values to be extracted in low brightness.

4. A color processing method according to claim 1, wherein the conversion target value is a grid value of a lookup table to be created.

5. A color processing method according to claim 1, wherein a weight function used in the weighting process is given as $f(d)=1/(1+d^4)$.

6. A color processing method according to claim 1, wherein, in a case where the conversion target value is outside a color gamut of the output device, said extracting step is performed in such manner as to extract, from the colorimetry values of the color patches on the surface of the color gamut of the output device, the colorimetry values close to a projection of the conversion target value onto the color gamut of the output device.

7. A color processing apparatus for converting a device-independent color space into a color space dependent on an output device, comprising:
    an input unit for inputting a colorimetry value of color patches output by said output device, the colorimetry values representing points in the device-independent color space;
    an extraction unit for extracting colorimetry values close to a conversion target value represented in the device-independent color space, from the input colorimetry values, the number of the extracted colorimetry values complying with brightness of the conversion target value; and
    a performing unit, adapted to perform, according to respective distances between the conversion target value and each extracted colorimetry value in the device-independent color space, a weighting process for output device dependent color values corresponding to respective ones of the extracted colorimetry values so as to obtain an output device dependent color value corresponding to the conversion target value.

8. A computer readable medium which stores a program to achieve a color processing method for converting a device-independent color space into a color space dependent on an output device, said program comprising:
    an input module for inputting colorimetry values of color patches output by the output device, the colorimetry values representing points in the device-independent color space;
    an extraction module for extracting colorimetry values close to a conversion target value represented in the device-independent color space, from the input colorimetry values, the number of the extracted colorimetry values complying with brightness of the conversion target value; and
    a processing module for performing, according to respective distances between the conversion target value and each extracted colorimetry value in the device-independent color space, a weighting process for output device dependent color values corresponding to respective ones of the extracted colorimetry values so as to obtain an output device dependent color value corresponding to the conversion target value.

9. A color processing method according to claim 1, further comprising the step of mapping the conversion target value outside the color gamut of the output device into the color gamut of the output device.

* * * * *